(12) United States Patent
Qu et al.

(10) Patent No.: US 7,733,828 B2
(45) Date of Patent: Jun. 8, 2010

(54) METHOD FOR ALLOCATING TIME-FREQUENCY RESOURCES IN A COMMUNICATION SYSTEM

(75) Inventors: Bingyu Qu, Shenzhen (CN); Sha Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 568 days.

(21) Appl. No.: 11/627,203

(22) Filed: Jan. 25, 2007

(65) Prior Publication Data
US 2007/0153834 A1    Jul. 5, 2007

Related U.S. Application Data

(63) Continuation of application No. PCT/CN2005/001129, filed on Jul. 27, 2005.

(30) Foreign Application Priority Data

Jul. 27, 2004    (CN)    ............... 2004 1 0054667

(51) Int. Cl.
*H04W 4/00* (2009.01)
(52) U.S. Cl. ..................... 370/330; 370/478
(58) Field of Classification Search ............. None
See application file for complete search history.

(56) References Cited

U.S. PATENT DOCUMENTS

| 5,357,502 | A | | 10/1994 | Castelain et al. |
| 5,525,982 | A | * | 6/1996 | Cheng et al. ............... 341/51 |
| 5,771,224 | A | | 6/1998 | Seki et al. |
| 5,802,044 | A | * | 9/1998 | Baum et al. ............... 370/330 |
| 6,141,317 | A | * | 10/2000 | Marchok et al. ........... 370/208 |
| 6,246,481 | B1 | * | 6/2001 | Hill ........................... 356/487 |
| 6,377,562 | B1 | * | 4/2002 | Schneider .................. 370/330 |
| 6,636,566 | B1 | * | 10/2003 | Roberts et al. ............. 375/247 |
| 7,047,009 | B2 | * | 5/2006 | Laroia et al. ............... 455/437 |
| 2004/0005016 | A1 | * | 1/2004 | Tewfik et al. .............. 375/302 |
| 2004/0229615 | A1 | * | 11/2004 | Agrawal ..................... 455/436 |
| 2004/0240378 | A1 | * | 12/2004 | Kei Ng et al. .............. 370/206 |
| 2005/0085236 | A1 | * | 4/2005 | Gerlach et al. ............. 455/450 |
| 2006/0002452 | A1 | * | 1/2006 | Laroia et al. ............... 375/135 |

FOREIGN PATENT DOCUMENTS

| CN | 1434588 | 8/2003 |
| EP | 0820172 A2 | 1/1998 |

* cited by examiner

*Primary Examiner*—Jayanti K Patel
*Assistant Examiner*—Hooman Houshmand
(74) *Attorney, Agent, or Firm*—Leydig, Voit & Mayer, Ltd.

(57) ABSTRACT

A method and apparatus are described that facilitate reducing intra-cell interference and meanwhile randomizing inter-cell interference without cell planning. Segment time-frequency patterns can be obtained to form multiple different segment time-frequency pattern sets where the segment time-frequency patterns in one time-frequency pattern set are orthogonal to each other. Randomly select at least one segment time-frequency pattern set in each TTI. Within each TTI, at least one user and/or traffic channel in one cell may be randomly assigned to at least one segment time-frequency pattern of the segment time-frequency pattern set.

17 Claims, 1 Drawing Sheet

METHOD FOR ALLOCATING TIME-FREQUENCY RESOURCES IN A COMMUNICATION SYSTEM

This application is a continuation of International Patent Application No. PCT/CN2005/001129, filed Jul. 27, 2005, which claims priority to Chinese Patent Application No. 200410054667.6, filed Jul. 27, 2004, all of which are hereby incorporated by reference.

FIELD OF THE TECHNOLOGY

The present invention relates to technologies for allocating time-frequency resources in a wireless communication system, and more specifically, to a method for allocating time-frequency resources in a wireless communication system based on Orthogonal Frequency Division Multiplexing (OFDM) technology.

BACKGROUND OF THE INVENTION

In a geographically divided communication system, e.g., a cellular wireless system, a frequency reuse scheme may be implemented by different communication areas according to the geographical division to improve the capacity of the wireless communication system. Each communication area is called a cell. When the frequency resources are allocated using a reuse factor of 1, different cells use the same frequency. At this time, signal interference between different cells may be caused.

Due to the feature of being able to overcome multi-path propagation and simplicity in equalization, the OFDM technology is drawing more and more attention. The OFDM divides the time-frequency resources of a wireless communication system into several orthogonal narrow-band sub-channels. High-rate data flows are transmitted in parallel in each sub-channel after a serial-to-parallel conversion. Since the narrow-band feature of the sub-channel can conquer the multipath affects and ensure the orthogonality between sub-channels, thereby ensuring that there is little interference between intra-cell users. The international patent application PCT/CN2004/000128, titled "Multiplexing scheme in a communication system", describes a method for allocating time-frequency resources in an OFDM communication system. The method ensures little intra-cell interference while randomizing inter-cell interference. A feature of the method is that no frequency planning is needed, which makes the method especially applicable to the case with a frequency reuse factor of 1. Specifically, the method includes the steps of: generating a generic time-frequency pattern; generating a set of orthogonal time-frequency patterns from the generic time-frequency pattern; performing a random cyclic shift of the set of orthogonal time-frequency patterns in each Transmission Time Interval (TTI); and allocating the obtained orthogonal time-frequency patterns to at least one user and/or traffic channel.

In the PCT application, the generic time-frequency pattern is generated by a Costas sequence. The random variable cyclic shift of the orthogonal time-frequency patterns may be performed in the time domain or in the frequency domain. The obtained orthogonal time-frequency patterns may be allocated to at least one user and/or traffic channel in a random manner.

One embodiment of the above PCT application will be described hereinafter.

The time-frequency resources of an OFDM wireless communication system can be seen as a two-dimensional time-frequency plane. In the solution, the bandwidth allocated to the whole wireless communication system is pre-divided into N sub-carriers in frequency domain, and n consecutive sub-carriers construct a sub-band. The whole available frequency resources of the user and/or traffic channel may be divided into [N/n]=F sub-bands. Each sub-band may be considered as a basic frequency unit. Meanwhile, a TTI includes M basic time units and each basic time unit may be an OFDM symbol time. Thus the time-frequency plane in a TTI is a set of two-dimensional grids in M basic time units and F basic frequency units.

A time-frequency pattern is defined as a set of two-dimensional grids in a time-frequency plane. The time-frequency resources in a TTI may be divided into a set of time-frequency patterns orthogonal to each other. Thus the time-frequency resources may be shared by allocating the time-frequency patterns to at least one user and/or traffic channel.

In the PCT application, each time-frequency pattern may be expressed as a sequence of indices of basic frequency units used in each basic time unit according to the order of the basic time unit. For example, the time-frequency pattern corresponding to the sequence $P=\{p(0),p(1),p(2),\ldots,p(M-1)\}$ is the index $p(k)$ of the occupied frequency unit in the kth basic time unit.

The time-frequency pattern may be a Costas sequence with length of F, and the Costas sequence may be expressed as $$TFP_{generic}=\{p(0),p(1),p(2),\ldots,p(F-1)\},$$

in which the Costas sequence $\{p_i\}$ with length of F is defined as a permutation sequence of integers $\{0,1,2,\ldots F-1\}$ and when $i \neq j$ and $i+n, i, j+n, j \in \{0,1,\ldots,F-1\}$, it satisfies that $p_{i+n}-p_i \neq p_{j+n}-p_j$.

The time-frequency pattern $TF_0^0$ is generated by the $TFP_{generic}$. The length of the $TF_0^0$ is M. When $M \leq F$, $TF_0^0(k)=p(k)$, where $k=0,1,2,\ldots(M-1)$. That is, the time-frequency pattern is generated by the sequence segment including the first M elements of the $TFP_{generic}$. When $M>F$, $TF_0^0(k)=p(k)$ if $k=0,1,2,\ldots(F-1)$, while $TF_0^0(k)=p(M-k-1)$ if $k=F,(F+1),\ldots,(M-1)$. That is, the time-frequency pattern is generated by $TFP_{generic}$ and a converse sequence of its first $(M-F)$ elements.

Writing $TF_0^0(k)=s_0^0(k)$, where $k=0,1,2,\ldots,(M-1)$, the time-frequency pattern generated by f cyclic shifts in the frequency domain of the time-frequency pattern $TF_0^0$ may be written as $TF_f^0(k)=s_f^0(k)$ $k=0,1,2,\ldots(M-1)$, where $s_f^0(k)=(s_0^0(k)+f) \bmod F$.

As can be seen from the above, different frequency-domain cyclic shifts generate different orthogonal time-frequency patterns, and totally F orthogonal time-frequency patterns may be generated. The set of orthogonal time-frequency patterns may be allocated to at least one user and/or traffic channel in one cell. In each TTI, available time-frequency patterns in one cell may be generated by random cyclic shifts in the time domain of the set of orthogonal time-frequency patterns. For example, the pattern generated by t cyclic shifts in the time domain of the time-frequency pattern $TF_0^0$ may be written as $$TF_f^t(k)=s_f^t(k)\ k=0,1,2,\ldots(M-1)$$

where $s_f^t(k)=s_f^0((k+t) \bmod M)$, and the time-frequency pattern $TF_0^0$ may be performed M different cyclic shifts in the time domain.

In order to reduce collisions of the time-frequency patterns between cells, each cell has a special multi-level pseudo-random sequence for controlling the shifts t in the time domain which changes as the TTI changes. The multi-level pseudo-random sequence has pseudo-random property and thus even though two cells select the same cyclic shift value in the time domain in a certain TTI and cause synchronization, they have little possibility of synchronization in next TTI.

Although the probability of selecting the same cyclic shift value in the time domain in a certain TTI by two cells is 1/M, once the case occurs, the time-frequency patterns of the two cells are the same. Such case leads to complete interference of the traffic channels of the two cells, and thereby leading to higher error rate. In order to further decrease the interference of the traffic channels, a traffic channel may randomly select one of the generated F orthogonal time-frequency patterns in each TTI. As such, in the case that the time-frequency resources of the cell are not fully used, the probability of full overlap between a time-frequency pattern and that of an adjacent cell is smaller than 1/M, but larger than 1/(M*F). For example, when M=12, F=15, the number of the total available time-frequency patterns is only 15*12, and even in a most random selection case, the probability when the time-frequency pattern used by a traffic channel in a certain cell is also used by a traffic channel in the adjacent cell is larger than 1/(15*12).

As can be seen from the above description, the time-frequency resources may be allocated with no resource planning in accordance with the above PCT application. The method in the above PCT application utilizes the random time shift to avoid the complete overlap of time-frequency patterns between cells and utilizes the random frequency shift to further reduce the probability of the overlap between traffic channels.

SUMMARY OF THE INVENTION

An embodiment of the present invention provides a method for allocating time-frequency resources in a communication system. The method requires no resource planning and ensures little intra-cell interference while randomizing inter-cell interference.

The method for allocating time-frequency resources in a communication system in accordance with an embodiment of the present invention includes the steps of:

configuring at least one time-frequency pattern for allocating time-frequency resources in a communication system;

extracting segment time-frequency patterns from the time-frequency pattern by a cyclic sliding window with one or more kinds of widths;

forming multiple different segment time-frequency pattern sets from the segment time-frequency patterns, wherein the segment time-frequency patterns in the same set are orthogonal to each other;

randomly selecting, for each Transmission Time Interval (TTI), at least one segment time-frequency pattern set; and allocating the segment time-frequency patterns in the selected segment time-frequency pattern set to at least one user and/or traffic channel in the TTI.

It can be seen from the above solution that an embodiment of the present invention extracts long time-frequency patterns which have better correlation properties into multiple segment time-frequency patterns, and then uses the segment time-frequency patterns to form multiple segment time-frequency pattern sets. In each TTI, randomly select a segment time-frequency pattern set, and form the physical resources for at least one user and/or traffic channel using the segment time-frequency patterns in the selected segment time-frequency pattern set in a random manner. In contrast, the PCT application "PCT/CN2004/000128" uses only one segment of one time-frequency pattern when M<=F, or uses only two segments of two time-frequency patterns when M>F to generate a generic time-frequency pattern, and then generates time-frequency pattern sets by cyclically shifting the generic time-frequency pattern.

The method of an embodiment of the present invention may increase the number of available time-frequency patterns in a TTI, while completely inheriting the excellent correlation property of long time-frequency patterns and decreasing the probability of complete overlap of traffic channels in different cells. Furthermore, in accordance with an embodiment of the present invention, the time-frequency resources in a TTI may be filled up by segments from multiple segment time-frequency pattern sets. Thus, the probability of complete overlap of traffic channels from different cells in one TTI will be even less, and the overlap, if any, includes time-frequency resources with smaller granularity, which changes the distribution of the overlapped time-frequency resources.

The difference between the embodiment of the present invention and the prior art is that a great deal of time-frequency patterns with small granularity may be formed in the frequency domain based on the sub-carriers, and the user channels may be generated by selecting several time-frequency patterns according to service requirements of the user. In this way, the number of the time-frequency patterns used in a TTI may be further increased while the probability of complete overlap of traffic channels of users may be decreased.

The method provided in an embodiment of the present invention requires no resource planning, ensures little intra-cell interference while randomizing inter-cell interference. Other objects and advantages of the invention will become apparent from a consideration of the drawings and ensuing description.

DETAILED DESCRIPTION OF THE INVENTION

Figure 1:
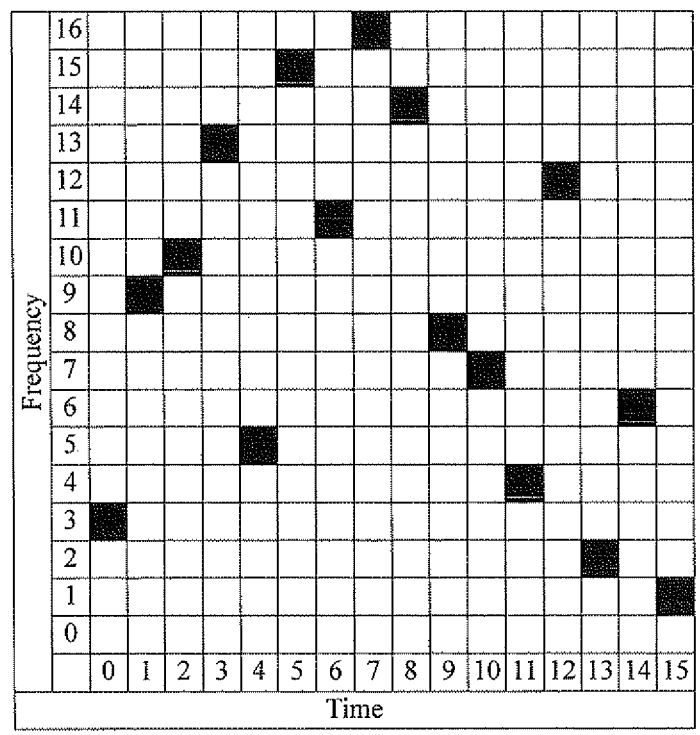
FIG. 1 is a schematic diagram of a time-frequency pattern corresponding to a long sequence according to an embodiment of the present invention.

The present invention will be described in detail with reference to accompanying drawings and embodiments.

In the embodiments of the PCT application PCT/CN2004/000128, as the available value of a time shift and value of a frequency shift are relatively finite, the random property is insufficient, which may lead to higher probability of bigger granularity overlap of traffic channels between cells, reflected in a symbol synchronization system by a complete overlap of time-frequency patterns and in a symbol non-synchronization system by a partial overlap of each symbol within a time-frequency pattern. When there is a bigger granularity overlap, the solution in accordance with the above PCT application will lead to higher error rate.

In an embodiment of the present invention, the time-frequency resources of a cellular wireless communication system based on OFDM technology are expressed as a two-dimensional time-frequency plane. The time-frequency plane in a TTI is a set of two-dimensional grids in M basic time units and F basic frequency units. Generally, a basic time unit is an OFDM symbol and a basic frequency unit is a sub-carrier. It should be noted that a basic time unit may also include multiple OFDM symbols and a basic frequency unit may also include multiple sub-carriers. That is, the basic frequency unit may be constituted of sub-bands including multiple sub-carriers. A time-frequency pattern is defined as a set of two-dimensional grids in a time-frequency plane. The time-frequency resources in a TTI may be divided into a set of time-frequency patterns orthogonal to each other. Thus the time-frequency resources may be shared by allocating the time-frequency patterns to at least one user and/or traffic channel.

The method for allocating time-frequency resources in a communication system in accordance with an embodiment of the present invention includes the following steps.

Step 100: configure at least one time-frequency pattern for time-frequency resources according to a certain rule;

Step 101: extract segment time-frequency patterns from the time-frequency patterns by cyclic sliding windows with one or more kinds of width;

Step 102: form multiple segment time-frequency pattern sets, where the segment time-frequency patterns in the each segment time-frequency pattern set are orthogonal to each other;

Step 103: randomly select at least one segment time-frequency pattern set in each TTI;

Step 104: allocate the segment time-frequency patterns in the selected segment time-frequency pattern set to at least one user and/or traffic channel in the TTI.

Each step will be described in detail as follows.

The at least one time-frequency pattern configured in Step 100 satisfies the two-dimensional correlation property, that is, the time-frequency patterns in the each set are orthogonal to each other, and there is at most one hit between the time-frequency patterns in different sets.

The time-frequency pattern in Step 100 may be generated from a sequence satisfying the two-dimensional correlation property, i.e., the sequences are constituted by different sets, and the sequences in the same set are orthogonal to each other while there is at most one hit between the sequences from different sets. Mathematically the correlation property is expressed as: for different t,f, sequence $p(t,f,i), i=0,1,\ldots,L-1$, where L is the length of the sequence satisfies the properties of 1. for $f_1 \neq f_2$, $p(t,f_1,i) \neq p(t,f_2,i), i=0,1,\ldots,L-1$
2. for $t_1 \neq t_2, f_1, f_2$, there is at most one identical element between the sequence $p(t_1,f_1,i), i=0,1,\ldots,L-1$ and the sequence $p(t_2,f_2,i), i=0,1,\ldots,L-1$ where the integer variable t denotes different sets, and the integer variable f denotes different sequences in one set.

There are two ways to generate a time-frequency pattern from a sequence. The first way, also called method A: express the frequency unit indices corresponding to different time units by different sequences, that is, $p(t,f,i)$ represents the index of the frequency unit used in the ith time unit. The second way, also called method B: express the time unit indices corresponding to different frequency units by different sequences, that is, $p(t,f,i)$ represents the index of the time unit used in the ith frequency unit.

The sequence used to generate the time-frequency pattern in Step 100 may be a Costas sequence. More information about Costas sequence may be obtained by referring to "Solomon W. Golomb and Oscar Moreno, "On Periodicity properties of Costas Arrays and A Conjecture on Permutation Polynomials", IEEE Tran. On Information Theory, Vol. 42, No. 6 November 1996".

The method for generating a Costas sequence from exponential or logarithmic Welch is as follows:

Assume that p is a prime number and g is its primitive element, thus a sequence $\{g^1, g^2, \ldots, g^{p-1}\}$ with length of p−1 is a Costas sequence.

Assume that the number N of the basic frequency units used in a communication system is p or p−1. When the Costas sequence is generated from exponential Welch, the Costas sequence may be defined as $S_0^0=\{p(0),p(1),\ldots,p(p-2)\}$, $p(k)=g^{k+1}$. When the Costas sequence is generated from logarithmic Welch, the Costas sequence may be defined as $S_0^0=\{p(0),p(1),\ldots,p(p-2)\}$, where $p(k)=\log(k+1)$, and $\log: g^i \to i$, $i=0,1,\ldots,p-2$.

More Costas sequence may be defined as $S_f^0=\{s_f^0(0),s_f^0(1),s_f^0(2),\ldots,s_f^0(p-2)\}$, where $s_f^0(k)=(s_0^0(k)+f) \bmod p$. f may be any one of $0,1,\ldots,p-1$, and the subscript f represents the f shifts (mod p) of the sequence range. More Costas sequence may be defined as $S_f^t=\{(s_f^t(0),s_f^t(1),s_f^t(2),\ldots,(p-2)\}$, where $s_f^t(k)=s_f^0((k+t)\bmod(p-1))$. t may be any one of $0,1,\ldots,p-2$, and the superscript t represents t shifts (mod(p−1)) of the sequence domain.

For $s_f^t(i), i=0,1,\ldots,p-2$, $f \in \{0,1,\ldots,p-1\}$, $t \in \{0,1,\ldots,p-2\}$, define multiple sequences $p(t,f,i), i=0,1,\ldots,p-2$, $f \in \{0,1,\ldots,p-1\}$, $t \in \{0,1,\ldots,p-2\}$, $p(t,f,i):=s_f^t(i)$. It is understood from the Welch structure that $p(t,f,i)=s_f^t(i), i=0,1,\ldots,p-2$, $f \in \{0,1,\ldots,p-1\}, t \in \{0,1,\ldots,p-2\}$, where different values of t denote different sequence sets, and different values of f denote different sequences in one set, which satisfies the properties 1 and 2.

Multiple sequences $p(t,f,i), i=0,1,\ldots,p-2$, $p(t,f,i):=s_f^t(i)$, $i=0,1,\ldots,p-2, t \in \{0,1,\ldots,p-1\}, f \in \{0,1,\ldots,p-2\}$ may also be defined, which also satisfy the properties 1 and 2. The difference is that the range of each sequence by this definition does not fill [0,p−1].

Assume that the communication system uses N sub-carriers on the time-frequency plane, when N=p, $S_f^t=\{s_f^t(0),s_f^t(1),\ldots,s_f^t(p-2)\}$ may be used to represent the frequency unit index corresponding to the order of each time unit. For example, $s_f^t(k)$ represents that the frequency unit index corresponding to the kth time unit is $s_f^t(k)$, that is, the method A is used to generate a sequence. As such, the property 1 indicates that for the same t, the time-frequency patterns corresponding to different frequency shifts f are orthogonal, while the property 2 indicates that for two time-frequency patterns corresponding to two different time cyclic shifts t, there is at most one hit.

When N=p−1, $S_f^t=\{s_f^t(0),s_f^t(1),\ldots,s_f^t(p-2)\}$ may be used to denote the value of the time index corresponding to a frequency unit, that is, the method B is used to generate a sequence. As such, the property 1 indicates that for the same frequency cyclic shift t, the time-frequency patterns corresponding to different time shifts f are orthogonal, while the property 2 indicates that for two time-frequency patterns corresponding to two different frequency cyclic shifts t, there is at most one hit.

In accordance with the embodiment, the multiple time-frequency patterns based on Costas sequence generated from Welch may fill the entire time-frequency plane, while maintaining the good property of having at most one hit. However, the time-frequency patterns generated from Costas sequence constructed by $T_4$ in PCT application "PCT/CN2004/000128" have more hits.

The time-frequency patterns in Step 100 include all the elements from the time-frequency pattern cluster having the maximum number of time-frequency pattern sets and satisfying the two-dimensional correlation property. That is, if there is another time-frequency pattern set that can join the current time-frequency pattern cluster having the two-dimensional correlation property while still satisfying the two-dimensional correlation property, a larger time-frequency pattern cluster including this additional time-frequency pattern set is used. According to the Latin-square theory of J. H. van Lint and R. M. Wilson: *A Course in Combinatorics*, Second Edition, Cambridge University Press 1992, 2001, the maximum number of sets of n rank Latin-square is n−1. The Costas sequence forms a (q−1)*q rectangular Latin-square, and a q rank Latin-square is obtained by adding a column $(q-1, q-2, \ldots, 0)^T$. Therefore, the maximum number of sets formed by a Costas sequence is q−1. As such, it shows that the time-frequency pattern set in step 100 generated from the Costas sequence is the maximum set. Other sequences, such as Latin-square sequences, modified Latin-square sequences and Linear hyperbolic sequences may also be used to prove this property. The most random property may be obtained by selecting self-contained time-frequency patterns.

The time-frequency patterns configured in Step 100 may cover beyond the sub-carriers used by the communication system. In subsequence steps, the time-frequency patterns within the sub-carriers used by the communication system may be obtained by extraction. For example, in the Costas sequence case, a minimal prime number no less than the number of the sub-carriers used by the communication system may be selected in step 100. The time-frequency patterns configured in Step 100 can also not fill up the entire sub-carriers used by the communication system.

In Step 101, extract the time-frequency patterns obtained in Step 100 to obtain segments within the cyclic sliding window, where the cyclic sliding window may be in the time domain or in the frequency domain, or may be in both the time domain and the frequency domain.

When segments are extracted within the cyclic sliding window with width of S, generally, the width S of the cyclic sliding window is smaller than the time length T of the time-frequency pattern obtained in Step 100. For example, in an example in the PCT application "PCT/CN2004/000128", the number of the sub-carriers is 705 and the number of OFDM symbols in one TTI is 12. In terms that the frequency unit is a sub-carrier, the time-frequency patterns may be generated from a Costas sequence $s_f(i)$ with p=709 in Step 100. The number of the time-frequency pattern elements is p−1. When the time-frequency pattern is generated using the method A, the length of the time-frequency pattern L=p−1=708, as such the width S of the cyclic sliding window may be selected as the number of OFDM symbols in one TTI, i.e., 12, which is far less than the length of the time-frequency pattern, i.e., 708. In each time-frequency pattern in Step 100, T time segments with length of S may be extracted.

The extraction of the segments may be performed in the time domain and in the frequency domain simultaneously. When the time-frequency patterns in Step 100 go beyond the total number of the basic frequency units used by the communication system, perform an extraction with a cyclic sliding window in the time domain in Step 101 as well as an extraction with a cyclic sliding window in the frequency domain having a width equal to the total number of the basic frequency units. In this way, the frequency index exceeds the total number of the basic frequency units in each segment time-frequency pattern is discarded, that is, the point beyond the frequency limit is discarded. For example, In terms of Costas sequence $s_f(i)$, when the number of the sub-carriers used by the communication system is not p or p−1, a minimal prime number p larger than N may be selected to generate a Costas sequence with length of p−1. According to the above generation process of the time-frequency pattern, an extraction in the frequency domain may be performed after an extraction in the time domain to discard the time-frequency pattern points with frequency indices beyond $\{0,1,\ldots,N-1\}$. That is, an extraction with a frequency domain cyclic sliding window of width N is performed. In the extraction process, generally, only one kind of width for the cyclic sliding window may be adopted in the time domain, or in the frequency domain, or in both the time domain and the frequency domain. A cyclic sliding window of multiple kinds of widths may also be used, which is typical when the time-frequency plane in a TTI needs to be filled up by segment time-frequency patterns with different widths in the segment time-frequency pattern sets without overlap.

A time-frequency pattern cluster formed by the time-frequency patterns in Step 100 generally has a property that the time and/or frequency cyclic shifted version of one of the time-frequency patterns still belongs to the time-frequency pattern cluster. For example, the time cyclic shifted version and frequency cyclic shifted version of the time-frequency pattern generated from the Costas sequence is also an element of the of the time-frequency pattern cluster. Therefore, in Step 101, when an extraction with the cyclic sliding window having one or more kinds of widths is performed on the at least one time-frequency pattern of Step 100, the time and/or frequency location of the cyclic sliding window may be fixed, that is, the cyclic sliding window having fixed time and/or frequency locations are used to extract the time-frequency patterns of Step 100. Only the non-repeating segment time-frequency patterns are remained.

In Step 102, set the segment time-frequency patterns obtained in Step 101 into multiple different segment time-frequency pattern sets, where the segment time-frequency patterns in one time-frequency pattern set are orthogonal to each other.

The at least one time-frequency pattern configured in Step 100 satisfies the two-dimensional correlation property, that is, the time-frequency patterns may be divided into multiple sets, the time-frequency patterns in one set are orthogonal to each other, and the number of hits between two time-frequency patterns in different sets is at most n. As such, the multiple different segment time-frequency pattern sets generated in Step 102 may be generated by the following steps: Perform Step 101 first to obtain segment time-frequency patterns. Specifically, for each given width, fix the location of the cyclic sliding window, and traverse a time-frequency set formed by the at least one time-frequency pattern of Step 100 to obtain corresponding segment time-frequency patterns. These segment time-frequency patterns are still orthogonal to each other and form a segment time-frequency pattern set of Step 102. In order to obtain multiple segment time-frequency pattern sets, traverse other time-frequency pattern sets formed by the at least one time-frequency pattern of Step 100 by the same way as described in Step 101. These segment time-frequency pattern sets still have the same two-dimensional correlation property as the original time-frequency pattern sets in Step 100 and naturally form the segment time-frequency pattern sets of Step 102. These segment time-frequency pattern sets correspond to the time-frequency pattern sets used in Step 101 in a one-to-one manner. Furthermore, segment time-frequency pattern sets may also be obtained by changing the location of the cyclic sliding window. When the time-frequency pattern cluster of Step 100 satisfies the property that the time and/or frequency shifted versions of a time-frequency pattern in the time-frequency pattern cluster are also elements of the time-frequency pattern cluster, the time and/or frequency window locations of the cyclic sliding windows may be fixed.

The segment time-frequency pattern sets generated in this way still have the two-dimensional correlation property while the total number of the hits will not increase. For example, two segment time-frequency patterns with length S in different segment time-frequency pattern sets come from two different time shifted versions of the same long time-frequency pattern of Step 100, or come from two long time-frequency patterns that have at most n hits of Step 100. The two segment time-frequency patterns have at most n hits because the fact that "a pair of long time-frequency patterns have at most n hits, and different time shifted versions of one long time-frequency pattern have at most n hits". Moreover, when the two segment time-frequency patterns have $n_1$ hits, correspondingly, there are at most $n-n_1$ hits between other pairs of segment time-frequency patterns with length of S which are extracted respectively from the complementary portions of the above two long patterns with at most n hits. As the communication system in consideration needs no time synchronization, the two time-frequency patterns generated by different time shifts of the time-frequency pattern in Step 100 are required to have at most n hits.

In the case that the time-frequency pattern is formed using the Costas sequence $S_f^r(i)$, all the above conditions are satisfied. Specifically, in Step 101, given a fixed value $t \in \{0, 1, \ldots, p-2\}$ and a fixed window location, traverse $f \in \{0, 1, 2, \ldots, p-1\}$ to obtain the orthogonal time-frequency pattern segments in a segment time-frequency pattern set. Further traverse all the values of $t \in \{0, 1, \ldots, p-2\}$ to obtain orthogonal segment time-frequency patterns in multiple segment time-frequency pattern sets. These segment time-frequency pattern sets are those needed in Step 102. When the method A is used to generate the time-frequency pattern from a sequence, f denotes the frequency shift, and t denotes the time shift, that is, the orthogonal time-frequency patterns in a segment time-frequency pattern set are obtained by the frequency shift, and different segment time-frequency pattern sets are obtained by time shift. When the method B is used to generate the time-frequency pattern from a sequence, f denotes the time shift, and t denotes the frequency shift, that is, the orthogonal time-frequency patterns in a segment time-frequency pattern set are obtained by time shift, and different segment time-frequency pattern sets are obtained by frequency shift.

In Step 103, randomly select, in each TTI, at least one segment time-frequency pattern set obtained in Step 102 in a specific selection manner of a cell.

For the segment time-frequency pattern sets generated by the cyclic sliding window in the time domain and/or the frequency domain, the time-frequency plane in a TTI may be divided into different blocks, each of which selects a segment time-frequency pattern set, thus the time-frequency plane in the TTI is filled up without overlap. For example, when the length of a TTI is 2n, the segment time-frequency patterns of two segment time-frequency pattern sets with length of n may be used to fill up the time-frequency plane in the TTI without overlap. The time-frequency plane in the TTI may be filled up by segment time-frequency patterns of segment time-frequency pattern sets with different lengths and the segment time-frequency pattern sets with different lengths may be obtained by extracting with a cyclic sliding window of multiple kinds of widths in Step 101. Even if the sub-carriers used by the time-frequency patterns of Step 100 do not occupy all the frequency resources of the communication system, the time-frequency plane in the TTI may also be filled up by multiple segment time-frequency pattern sets.

When the time-frequency patterns with lengths smaller than the number of the TTI time and/or frequency units are selected to fill up the time-frequency plane in the TTI, the granularity of resource allocation may be reduced, which can change the probability distribution of collision while keeping the probability of total conflicts unchanged, further reducing the probability of complete collision with big granularity.

The selection of time-frequency pattern sets may be preformed in a manner similar to that of the scrambling code in a Wideband Code division Multiplex Address (WCDMA) system and the selection of the value is random.

When two cells select the same segment time-frequency pattern set in Step 102 at the same time, it is understood from the randomicity of the selection that, the probability of selecting the same segment time-frequency pattern set by the two cells in next time is very small.

Specifically, in case that time-frequency pattern is generated from a Costas sequence $S_f^r(i)$, when the method A is used to generate the time-frequency patterns from a sequence, t denotes different time shifts, that is, step 103 selects different segment time-frequency pattern sets by randomly selecting different time shifts. When the method B is used to generate the time-frequency patterns from a sequence, t denotes different frequency shifts, that is, step 103 selects different segment time-frequency pattern sets by randomly selecting different frequency shifts.

In Step 104, in each TTI, at least one user and/or traffic channel in one cell may be mapped to at least one segment time-frequency pattern of the segment time-frequency pattern set selected in Step 103, that is, at least one user and/or traffic channel in one cell include at least one segment time-frequency pattern of the selected segment time-frequency pattern set in the TTI. In particular, when sub-carriers are used as the basic frequency units, multiple segment time-frequency patterns should be employed together to transmit higher rate traffic data. In this case, a traffic channel of a user generally uses multiple segment time-frequency patterns.

In Step 104, within each TTI, at least one user and/or traffic channel in one cell may be randomly assigned to at least one segment time-frequency pattern of the segment time-frequency pattern set selected in Step 103 in a random manner. When the time-frequency resources have not been completely occupied, the probability of selecting the same time-frequency patterns by two users from two cells may be further decreased.

Specifically, in case that the time-frequency pattern is generated from a Costas sequence $S_f^r(i)$, when the method A is used to generate the time-frequency pattern from a sequence, f denotes different frequency shifts, that is, step 104 allocates segment time-frequency patterns of the segment time-frequency pattern set to at least one user and/or traffic channel by selecting different frequency shifts. When the method B is used to generate the time-frequency pattern from a sequence, f denotes different time shifts, that is, step 104 allocates segment time-frequency patterns of the segment time-frequency pattern set to at least one user and/or traffic channel by selecting different time shifts. When the method A is used, consecutive frequency shift indices may be used to generate a traffic channel composed of multiple time-frequency patterns. When the method B is used, consecutive time shift indices may be used to generate a traffic channel composed of multiple time-frequency patterns. In the process of generating the traffic channel by the time-frequency patterns, each TTI can randomly select a start index of multiple time-frequency patterns for the traffic channel.

Besides the traffic channel, a wireless communication system generally includes other channels, such as signaling channel, common pilot channel, etc. When the method provided in the present invention is used, some time-frequency resources may be pre-reserved for such channels.

In accordance with the above method, a transmitting device in a wireless communication system is designed for implementing Steps 100-104. That is, the transmitting device may map the data of at least one user and/or traffic channel to a time-frequency plane for transmitting according to the time-frequency patterns used by at least one user and/or traffic channel. The transmitting device may be a transmitting device in the downlink or the uplink of a wireless communication system. Therefore, a wireless communication system requiring no resource planning should be set up with at least one such transmitting device.

A receiving device in a wireless communication system may be designed accordingly in connection with the transmitting device. The receiving device implements Steps 100-104, and extracts the data from the received data flow according to the time-frequency patterns used by the at least one user and/or traffic channel. The transmitting device includes at least the following units including coding, modulation, time-frequency resources allocation, IFFT, D/A, etc. The receiving device includes at least units of A/D, FFT, time-frequency resources de-mapping, demodulation, decoding, etc.

In the embodiment, the time-frequency pattern in Step 100 may be generated by Latin-square sequences, or modified Latin-square sequences. More information about the generation of Latin-square sequences is described in "Flarion Technologies, INC. U.S. Pat. No. 6,553,019 B1, Communications system employing orthogonal frequency division multiplexing based spread spectrum multiple access, Apr. 22, 2003".

Assume that the length N of a sequence is a prime number, and the modified Latin-square sequences may be written as $$S_0^0 = \{s_0^0(0), s_0^0(1), s_0^0(2), \ldots, s_0^0(N-2)\}, \text{ where } s_0^0(i) = i+1.$$

Multiplying the above sequence by a multiplicator f, then obtain the sequence as $$S_f^0 = \{s_f^0(0), s_f^0(1), s_f^0(2), \ldots, s_f^0(N-2)\}, \text{ where } s_f^0(i) = (f \cdot s_0^0(i)) \bmod N.$$

The value of f may be any one of $1, 2, \ldots, N-1$.
Cyclically shift $S_f^0$ by t, and obtain a sequence as $$S_f^t = \{s_f^t(0), s_f^t(1), s_f^t(2), \ldots, s_f^t(N-2)\}, \text{ where } s_f^t(i) = (s_f^0(i)+t) \bmod N.$$

The value of t may be any one of $1, 2, \ldots, N-1$.

Define $p(t,f,i) = s_f^t(i)$. In Step 100, the time-frequency pattern may be generated from the sequences by either the method A or the method B. For conciseness, take the method B as an example to generate a time-frequency pattern, that is, $s_f^t(i)$ denotes that the time unit corresponding to the ith basic frequency unit is $s_f^t(i)$, where t denotes the multiplicative factor and f denotes the time shift. Obviously, the defined $p(t,f,i)$ satisfies the properties 1 and 2.

In Step 101, extract the long time-frequency pattern in Step 100 using a time-domain cyclic sliding window with length of $S < N-1$, given a fixed multiplicative factor $t \in \{1, 2, \ldots, N-1\}$ and a fixed location of the time-domain cyclic sliding window. As such, the segment time-frequency patterns obtained by time shifting $f \in \{0, 1, 2, \ldots, N-1\}$ form orthogonal time-frequency patterns in a segment time-frequency pattern set.

In Step 102, traverse all values of $t \in \{1, 2, \ldots, N-1\}$ and obtain all the time-frequency pattern sets with window width of S.

In Step 103, in a TTI with length of S, randomly select a multiplicative factor $t \in \{1, 2, \ldots, N-1\}$ according to the cell-specific scrambling code from range $\{1, 2, \ldots, N-1\}$ of a cell to select a segment time-frequency pattern set.

In Step 104, upon selecting the segment time-frequency pattern set, randomly select time-frequency patterns of different time shifts within the segment time-frequency pattern set and allocate them to at least one user and/or traffic channel.

If it is defined that $p(t,f,i) = s_f^t(i)$, the different segment time-frequency pattern sets in Step 102 are obtained by using different time shifts, while the segment time-frequency patterns allocated to the traffic channel of the user in Step 104 are obtained by selecting different multiplicative factors. In this case, a selected segment time-frequency pattern set can not fill up the time-frequency plane in each TTI. A sub-carrier in the time-frequency plane is left unfilled according to different values of t. In this case, a segment time-frequency pattern set with frequency-domain window having width of 1 may be randomly selected to fill the sub-carrier so as to ensure good correlation.

If the above definition is modified as $S_0^0 = \{s_0^0(0), s_0^0(1), s_0^0(2), \ldots, s_0^0(N-1)\}$, where $s_0^0(i) = i$, and other conditions are unchanged, a Latin-square sequence may be obtained. In this case, define $p(t,f,i) = s_f^t(i)$, and the time-frequency patterns may be obtained using the method B, and other steps are similar to above described.

In this case, different segment time-frequency pattern sets in Step 102 are obtained by using different multiplicative factors, while the segment time-frequency patterns allocated to the traffic channel of the user in Step 104 are obtained by selecting different time shifts. Similarly, Linear hyperbolic sequences or modified Linear hyperbolic sequences may be used. The construction of the Linear hyperbolic sequences is described in Flarion Technologies. INC. WO/03001696 A2, Method of tone allocation for tone hopping sequences. Mar. 1, 2003.

The structure of the modified Linear hyperbolic sequences will be described hereinafter.

Define $F_{17}$, where $s_0^0(i) = i+1$.

Multiply the above sequence by a multiplicator of f, and obtain the sequence as $$S_f^0 = \{s_f^0(0), s_f^0(1), s_f^0(2), \ldots, s_f^0(N-2)\}, \text{ where } s_f^0(i) = (f \cdot (s_0^0(i))^{-1}) \bmod N.$$

Here the $(s_0^0(i))^{-1}$ may be defined as $$(s_0^0(i))^{-1} = \begin{cases} (s_0^0(i))^{-1} & s_0^0(i) \neq 0 \in GF(N) \\ 0 & s_0^0(i) = 0 \end{cases}$$

The value of f may be any one of $1, 2, \ldots, N-1$.
Cyclically shift $S_f^0$ by t, and obtain a sequence as $$S_f^t = \{s_f^t(0), s_f^t(1), s_f^t(2), \ldots, s_f^t(N-2)\}, \text{ where } s_f^t(i) = (s_f^0(i)+t) \bmod N.$$

The value of t may be any one of $1, 2, \ldots, N-1$.

Similarly, it may be defined that $p(t,f,i) = s_f^t(i)$ or, and time-frequency patterns may be generated by the methods A or B.

If the above definition is modified as $S_0^0 = \{s_0^0(0), s_0^0(1), s_0^0(2), \ldots, s_0^0(N-1)\}$, where $s_0^0(i) = i$, and other conditions remain unchanged, a Linear hyperbolic sequence may be obtained. The method for allocating the time-frequency resources using such a sequence is similar to the above described.

When Latin-square sequences or Linear hyperbolic sequences generate different time-frequency patterns of a time-frequency pattern set using different multiplicative factors, different time-frequency patterns are not orthogonal to each other, there is an hit between different time-frequency patterns. In this case, the orthogonality between different time-frequency patterns can be assured by allocating the hits to one of the time-frequency pattern.

An example is provided below to give a brief description. Assume that the basic frequency unit is a sub-carrier, the basic time unit is an OFDM symbol, configure N=17 sub-carriers in the frequency domain and configure the length of the TTI is the same as that of the segments, i.e., the length of the randomized area. Configure S=4 OFDM symbols in a TTI and configure 4 traffic channels in one cell. Generate a Costas sequence from the exponential Welch. The Costas sequence of length N−1=16 obtained from the exponent of the primitive root 3 of the finite domain may be written as $$L=\{3,9,10,13,5,15,11,16,14,8,7,4,12,2,6,1\}.$$

The sequence has 16 orthogonal time-domain cyclic shifts, and each time-domain cyclic shift has 17 frequency cyclic shifts that have no hit with each other, written as p(t,f,i), i=0, 1,...,15; t=0,1,2,...,15; f=0,1,2,...,16, where t denotes the value of the time-domain cyclic shift and f denotes the value of the frequency-domain cyclic shift. These sequences satisfy the two-dimensional correlation. In this case, t is used to mark different sets. The time-frequency patterns in each set are generated by different cyclic shifts of the first time-frequency pattern, i.e., the time-frequency pattern corresponding to f=0.

Here, the method A is used for generating the time-frequency pattern from a sequence, that is, the value of the kth element of the sequence represents the value of the frequency unit used by the time-frequency pattern in the kth time unit. The pattern corresponding to the sequence p(0,0,:)=L is shown in FIG. 1.

Using the time-domain cyclic sliding window of width M=4 of different locations to extract each of such long time-frequency patterns, 16 segment time-frequency patterns of length 4 that have no hit with each other may be obtained. Note that the segment obtained by extracting p(t,f,i) by the time-domain cyclic sliding window with the start location of $t_0$ is identical with that obtained by extracting p(t+$t_0$,f,i) by the time-domain cyclic sliding window with the start location of 0, thus there are 17*16=272 different segment time-frequency patterns.

Due to the above relationship between the location of the time-domain cyclic sliding window and the value of the time cyclic shift t, the segment time-frequency patterns may be generated just by fixing t and traversing the time-domain cyclic sliding window with all possible locations, or by fixing location of the cyclic sliding window and traversing all the possible values of t. Different locations of the time-domain cyclic sliding window correspond to different orthogonal segment time-frequency pattern sets, and there are totally 16 segment time-frequency pattern sets. Within each segment time-frequency pattern set are 17 segment time-frequency patterns. The segment time-frequency patterns in the same set are generated by different cyclical frequency shift of the same segment time-frequency pattern and may fill the entire time-frequency plane of the TTI. Such time-frequency pattern sets generated in this way still satisfy the property that the segment time-frequency patterns in one set have no hits and any two segment time-frequency patterns in different sets have at most one hit.

Denote these segment time-frequency patterns by $L^i_j$, i=0, 1,2,...,15; j=0,1,2,...,16, where i denotes different locations of the sliding window, i.e., the set index, and j denotes different values of cyclic frequency shift.

The scrambling code sequence of each cell in each TTI indicates the selected orthogonal segment time-frequency pattern set, i.e., indicates different values of i. The selections are performed in each cell independently, and thus a same i may be selected by different cells. Assume that cell A in the current TTI selects the orthogonal set of i=3, and cell B selects the orthogonal set of i=6.

As the number of the traffic channels in one cell is 4, each traffic channel is constituted of 4 or 5 segment time-frequency patterns in the orthogonal segment time-frequency pattern set selected by the current TTI, in which these segment time-frequency patterns constructing an orthogonal segment time-frequency pattern set may be either consecutive patterns or non-consecutive patterns. The two cells may randomly select the time-frequency patterns used by the traffic channels in each TTI. For example, the traffic channels 1, 2, 3 and 4 of cell A in the current TTI may be $\{L_0^3,L_1^3,L_2^3,L_3^3\}$, $\{L_4^3,L_5^3,L_6^3,L_7^3\}$, $\{L_8^3,L_9^3,L_{10}^3,L_{11}^3\}$ and $\{L_{12}^3,L_{13}^3,L_{14}^3,L_{15}^3\}$, respectively, while the traffic channels 1, 2, 3 and 4 of cell B in the current TTI may be $\{L_3^6,L_4^6,L_5^6,L_6^6\}$, $\{L_7^6,L_8^6,L_9^6,L_{10}^6\}$, $\{L_{11}^6,L_{12}^6,L_{13}^6,L_{14}^6\}$ and $\{L_{15}^6,L_{16}^6,L_0^6,L_1^6\}$, respectively. In this case, the number of hits between any two traffic channels of the two cells is at most 4.

For example, when a user uses the third traffic channel $\{L_{11}^6,L_{12}^6,L_{13}^6,L_{14}^6\}$ of cell B, there will be $$L_{11}^6=\{5,10,8,2\}, L_{12}^6=\{6,11,9,3\}, L_{13}^6=\{7,12,10,4\},$$
$$L_{14}^6=\{8,13,11,5\}.$$

Figure 2:
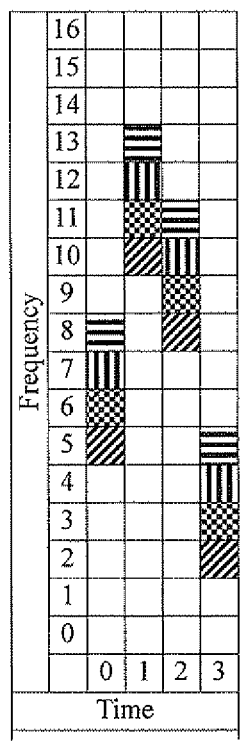
FIG. 2 is a schematic diagram of a time-frequency pattern allocated to a traffic channel of a user in a cell according to an embodiment of the present invention.

As shown in FIG. 2, such a channel includes 4 segment time-frequency patterns, where each kind of shade represents one time-frequency pattern.

When N is not a prime number or a number generated by subtracting 1 from a prime number, and if Welch is still used for constructing a generic sequence, a minimal prime number p that is larger than N may be selected to generate a Costas sequence of length p−1. For example, when N=14, the minimal prime number p=17 that is larger than 14 is used. The p=17 non-orthogonal cyclic frequency shifts of the constructed Costas sequence may generate multiple sequences in Step 100. When there is a value larger than 13 in the value domain of the sequence, the point in the time-frequency plane corresponding to the value is discarded.

In this case, different segment time-frequency pattern sets are obtained by different time shifts, while the time-frequency patterns allocated to the traffic channels of the user are obtained by selecting different values of cyclic frequency shifts.

On the other hand, the time-frequency patterns configured in Step 100 may be divided as follows, the time-frequency patterns in each set are generated by different time cyclic shifts of the first time-frequency pattern. The first time-frequency patterns of different sets are different frequency cyclic shifts of sequence L. In the case of method A, the sequence may be written as p(t,f,i), i=0,1,...,15; t=0,1,2,...,16; f=0,1,2,...,15, t denotes the value of the frequency cyclic shift, f denotes the value of the time cyclic shift. As such, t is used to mark different sets and the time-frequency patterns in each set are generated by different time cyclic shifts of the first time-frequency pattern.

Using the time-domain cyclic sliding window of width M=4 in different locations to extract each of such long time-frequency patterns, 16 segment time-frequency patterns of length 4 that have no hit with each other may be obtained. It should be noted that, when the frequency shift t is fixed, the segment time-frequency pattern sets constructed by segments extracted by time-domain cyclic sliding window of different locations are the same. Therefore, what is needed is to determine a fixed location of the time-domain cyclic sliding window and traverse all the frequency shifts t. For example, when the location of the time-domain cyclic sliding window is 0, different orthogonal segment time-frequency pattern sets, totally 17 sets, may be obtained by traversing all the frequency shifts t. 16 segment time-frequency patterns are in each set and the segment time-frequency patterns in the same set are generated by cyclically shifting the same long time-frequency pattern.

In this case, different segment time-frequency pattern sets are obtained by different frequency shifts, while the time-frequency patterns allocated to the traffic channels of the user are obtained by selecting different values of cyclic time shifts.

The foregoing is only the preferred embodiments of this invention and are not intended to limit the protection scope of the present invention. The invention is to cover all the modifications, variations and equivalent replacements within the spirit and scope of the disclosure as defined by the appended claims.

The invention claimed is:

1. A method for allocating time-frequency resources in a communication system, applicable to wireless communication systems using Orthogonal Frequency Division Multiplexing (OFDM) technology, comprising:
    configuring at least one time-frequency pattern for allocating time-frequency resources in a communication system, wherein the at least one time-frequency pattern is divided into at least one set, the time-frequency patterns in the same set are orthogonal to each other and the time-frequency patterns in different sets have at most one hit, the at least one time-frequency pattern configured for allocating time-frequency resources in a communication system comprises all elements from a time-frequency pattern cluster having the maximum number of time-frequency pattern sets and satisfies two-dimensional correlation property;
    extracting segment time-frequency patterns from the time-frequency pattern by a cyclic sliding window with one width or by more than one cyclic sliding window;
    forming multiple segment time-frequency pattern sets from the obtained segment time-frequency patterns, wherein the segment time-frequency patterns in the same segment time-frequency pattern set are orthogonal to each other;
    randomly selecting, for each Transmission Time Interval (TTI), at least one segment time-frequency pattern set; and
    allocating the segment time-frequency patterns in the selected segment time-frequency pattern set to at least one user and/or traffic channel in the TTI.

2. The method of claim 1, wherein the step of extracting segment time-frequency patterns from the time-frequency pattern by a cyclic sliding window with one width or by more than one cyclic sliding window comprises:
    being given a width and a fixed location for the cyclic sliding window, traversing and extracting from, by said cyclic sliding window with the fixed location, the orthogonal time-frequency patterns in one time-frequency pattern set constructed by the at least one time-frequency pattern, to obtain multiple segment time-frequency patterns corresponding to the time-frequency pattern set;
    traversing, by the same way, other time-frequency pattern sets constructed by the at least one time-frequency pattern, obtaining multiple segment time-frequency patterns corresponding to each time-frequency pattern set respectively, the multiple segment time-frequency patterns corresponding to each time-frequency pattern set are orthogonal to each other;
    the step of forming multiple different segment time-frequency pattern sets according to the obtained segment time-frequency patterns comprises:
    the multiple segment time-frequency patterns obtained from one time-frequency pattern set naturally forming a segment time-frequency pattern set, each formed time-frequency pattern set corresponds to a time-frequency pattern set in a one to one manner.

3. The method of claim 1, wherein, when the number of the at least one time-frequency pattern configured for allocating time-frequency resources in a communication system exceeds the number of basic frequency units used in the wireless communication system, performing an extraction with a cyclic sliding window whose width is equal to the total number of the basic frequency units.

4. The method of claim 1, wherein the at least one time-frequency pattern configured for allocating time-frequency resources in a communication system is generated by at least one sequence, the time-frequency pattern is a mapping of frequency unit indices corresponding to the order of each basic time unit, or a mapping of time unit indices corresponding to the order of each basic frequency unit.

5. The method of claim 4, wherein the basic frequency unit is a sub-carrier.

6. The method of claim 4, wherein the sequence is one of a Costas sequence, a Latin-square sequence, a modified Latin-square sequence, a linear hyperbolic sequence and a modified linear hyperbolic sequence.

7. The method of claim 4, wherein the sequence is a Costas sequence constructed from Welch.

8. The method of claim 4, wherein the sequence is a Costas sequence,
    the step of extracting segment time-frequency patterns from the time-frequency pattern by a cyclic sliding window with one width or by more than one cyclic sliding window comprises:
    being given a width and a fixed location for the cyclic sliding window, traversing the time-frequency patterns generated from different frequency shifts for one time shift, obtaining segment time-frequency patterns that are orthogonal to each other in one segment time-frequency pattern set;
    traversing different time shifts and obtaining orthogonal segment time-frequency patterns in different segment time-frequency pattern sets;
    the step of allocating the segment time-frequency patterns in the selected segment time-frequency pattern set to at least one user and/or traffic channel is implemented by selecting a value of the cyclic frequency shift;
    or, the step of extracting segment time-frequency patterns from the time-frequency pattern by a cyclic sliding window with one width or multiple kinds of widths comprises:
    being given a width and a fixed location for the cyclic sliding window, traversing the time-frequency patterns generated from different time shifts for one frequency shift, to obtain segment time-frequency patterns that are orthogonal to each other in one segment time-frequency pattern set;
    traversing different frequency shifts and obtaining orthogonal segment time-frequency patterns in different segment time-frequency pattern sets;
    the step of allocating the segment time-frequency patterns in the selected segment time-frequency pattern set to at least one user and/or traffic channel is implemented by selecting value of the cyclic time shift.

9. The method of claim 4, wherein the sequence is a Latin-square sequence, or a modified Latin-square sequence, or a Linear hyperbolic sequence or a modified Linear hyperbolic sequence;
    the step of extracting segment time-frequency patterns from the time-frequency pattern by a cyclic sliding window with one width or by more than one cyclic sliding window comprises:

being given a width and a fixed location for the cyclic sliding window, traversing the time-frequency patterns generated from different multiplicative factors for one time shift, to obtain segment time-frequency patterns that are orthogonal to each other in one segment time-frequency pattern set;

traversing different time shifts and obtaining orthogonal segment time-frequency patterns in different segment time-frequency pattern sets;

the step of allocating the segment time-frequency patterns in the selected segment time-frequency pattern set to at least one user and/or traffic channel is implemented by selecting different multiplicative factors;

or, the step of extracting segment time-frequency patterns from the time-frequency pattern by a cyclic sliding window with one width or by more than one cyclic sliding window comprises:

being given a width and a fixed location for the cyclic sliding window, traversing the time-frequency patterns generated from different time shifts for one multiplicative factor, obtaining segment time-frequency patterns that are orthogonal to each other in one segment time-frequency pattern set;

traversing different multiplicative factors and obtaining orthogonal segment time-frequency patterns in different segment time-frequency pattern sets;

the step of allocating the segment time-frequency patterns in the selected segment time-frequency pattern set to at least one user and/or traffic channel is implemented by selecting different multiplicative factors.

10. The method of claim 1, wherein the cyclic sliding window extracts the time-frequency pattern in the time domain, or in the frequency domain, or in both of the time domain and the frequency domain.

11. The method of claim 1, wherein the cyclic sliding window has a fixed time and/or a fixed frequency location.

12. The method of claim 1, wherein the mode of the random selection of the at least one segment time-frequency pattern set is determined by a cell-specific multi-level pseudo-random sequence.

13. The method of claim 1, wherein the at least one segment time-frequency pattern set randomly selected in each TTI fills up the time-frequency resources within the TTI without overlap.

14. The method of claim 1, wherein the allocation of the segment time-frequency patterns in the selected segment time-frequency pattern set to at least one user and/or traffic channel is random during each TTI.

15. The method of claim 1, further comprising a process of transmitting a data flow using the allocated segment time-frequency patterns:

mapping the data flow of at least one user and/or traffic channel to the allocated segment time-frequency patterns for transmitting.

16. The method of claim 1, further comprising a process of receiving a data flow using the allocated segment time-frequency patterns:

de-mapping data of at least one user and/or traffic channel from the received data flow according to the allocated segment time-frequency patterns.

17. The method of claim 1, wherein the more than one cyclic sliding window is of the same width or different width.

* * * * *